United States Patent [19]
Morgan et al.

[11] Patent Number: 6,068,227
[45] Date of Patent: May 30, 2000

[54] FLAT PANEL DISPLAY HOUSING

[75] Inventors: Stuart K. Morgan, Westford; Arthur J. Flagg, III, Sudbury; Bryan R. Hotaling, Arlington; Jon R. Rossman, Chelmsford, all of Mass.

[73] Assignee: PixelVision Technology, Inc., Acton, Mass.

[21] Appl. No.: 08/815,183

[22] Filed: Mar. 11, 1997

[51] Int. Cl.[7] .................................................. E04G 3/00
[52] U.S. Cl. ................................. 248/278.1; 248/184.1; 248/923
[58] Field of Search ................................. 248/371, 398, 248/276.1, 299.1, 923, 286.1, 442.2, 124, 447, 280.1, 122.1, 291.1, 919, 920, 922, 124.1, 125.9, 184.1, 123.1, 419, 183.1, 278.1, 279.1, 280.11, 281.11, 918, 921

[56] References Cited

U.S. PATENT DOCUMENTS

| | | | |
|---|---|---|---|
| 2,990,204 | 6/1961 | Golden | 248/291.1 |
| 4,708,312 | 11/1987 | Rohr | 248/280.1 |
| 4,729,533 | 3/1988 | Hillary et al. | 248/184 |
| 4,915,450 | 4/1990 | Cooper | 297/423 |
| 4,932,620 | 6/1990 | Foy | 248/124 |
| 5,299,017 | 3/1994 | Furuno | 348/786 |
| 5,415,372 | 5/1995 | Shepherd et al. | 248/447 |
| 5,553,820 | 9/1996 | Karten et al. | 248/286.1 |
| 5,668,612 | 9/1997 | Hung | 348/818 |
| 5,683,070 | 11/1997 | Seed | 248/442.2 |
| 5,687,945 | 11/1997 | Lee | 248/442.2 |
| 5,746,408 | 5/1998 | Theirl et al. | 248/295.11 |
| 5,751,548 | 5/1998 | Hall et al. | 361/686 |
| 5,754,259 | 5/1998 | Nakamatsu et al. | 348/835 |
| 5,797,568 | 8/1998 | Canton Gongora et al. | 248/122.1 |
| 5,797,570 | 8/1998 | Dolan et al. | 248/205.3 |
| 5,812,368 | 9/1998 | Chen et al. | 361/681 |

OTHER PUBLICATIONS

*PixelVision Brochure,* "Flat–Panel Monitor Vendors at Comdex 1996".

*Primary Examiner*—Ramon O. Ramirez
*Assistant Examiner*—Tan Le
*Attorney, Agent, or Firm*—Weingarten, Schurgin, Gagnebin & Hayes LLP

[57] ABSTRACT

A flat panel display housing includes a minimal border about the periphery of the front surface of the housing. The border has a relatively small thickness and only extends a minimal distance from the edge of the display housing. The housing also includes a mount centrally located on the rear surface of the housing thereby allowing the housing to be tiled. The housing may also be configured as an array or wall of glass without interstices between adjacent displays. The display housing also includes a recess in the rear portion of the housing which facilitates tactile location of display controls which are not visible to a user.

24 Claims, 5 Drawing Sheets

FLAT PANEL DISPLAY HOUSING

CROSS REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

Flat panel display screens are typically mounted within housings particularly adapted to accommodate such displays. Flat panel displays are usually employed as a component of a computer system when space is limited. Accordingly, in space critical applications, flat panel displays are preferred to conventional cathode ray tube (CRT) displays even though flat panel displays are presently more costly than CRTs. Flat panel displays also are preferred in certain applications due to the fact that they tend to be low in weight and require less power than CRT displays.

Typical flat panel display housings have been designed as shrunken versions of CRT. As such, conventional flat panel display housings are often not mechanically suited in applications in which a plurality of displays are desired to make up one larger virtual display. Additionally, conventional housings typically employ a substantial bezel around the front periphery of the flat panel display screen. Such bezels are disadvantageous in presenting the appearance of a single virtual monitor when a plurality of monitors are associated side by side, above and below one another or as a collection of displays arranged as a "wall of glass". Additionally conventional flat panel display housings typically have soft or rounded corners, include a support base extending from underneath the display and provide controls such as contrast, brightness or a power switch on the front surface of the housing or along one of the edges of the flat panel display housing. Such mechanical arrangements undesirablly interfere with the arrangement and mounting of flat panel displays as a component of a "wall of glass" in which a plurality of flat panel display monitors are employed collectively as a single virtual monitor or to display more information than can reasonably be displayed on a single monitor.

BRIEF SUMMARY OF THE INVENTION

A housing for a flat panel display is disclosed. The housing provides for mounting of a flat panel display screen, such as an LCD screen or a plasma screen and provides a narrow bezel around the front periphery of the housing. The flat panel housing further includes straight parallel top and bottom edges, straight and parallel side edges and square corners so as to permit "tiling" of displays in a "wall of glass" (an array of displays arranged collectively in rows and/or columns) comprising a plurality of flat panel displays employing the presently disclosed housing.

A tilt/swivel mount is provided in a generally central location at the rear of the housing so as to allow for mounting of a plurality of housings in arrays comprising rows and/or columns. The display controls for the flat panel display are located on the rear surface of the housing so that when tiled or arranged in a "wall of glass" the only visible part of the display housing is the display housing border. Since the housing has straight opposing parallel sides and top and bottom edges and square corners, when the housings are tiled, gaps are minimized between adjacent display housings.

DETAILED DESCRIPTION OF THE INVENTION

Figure 1:
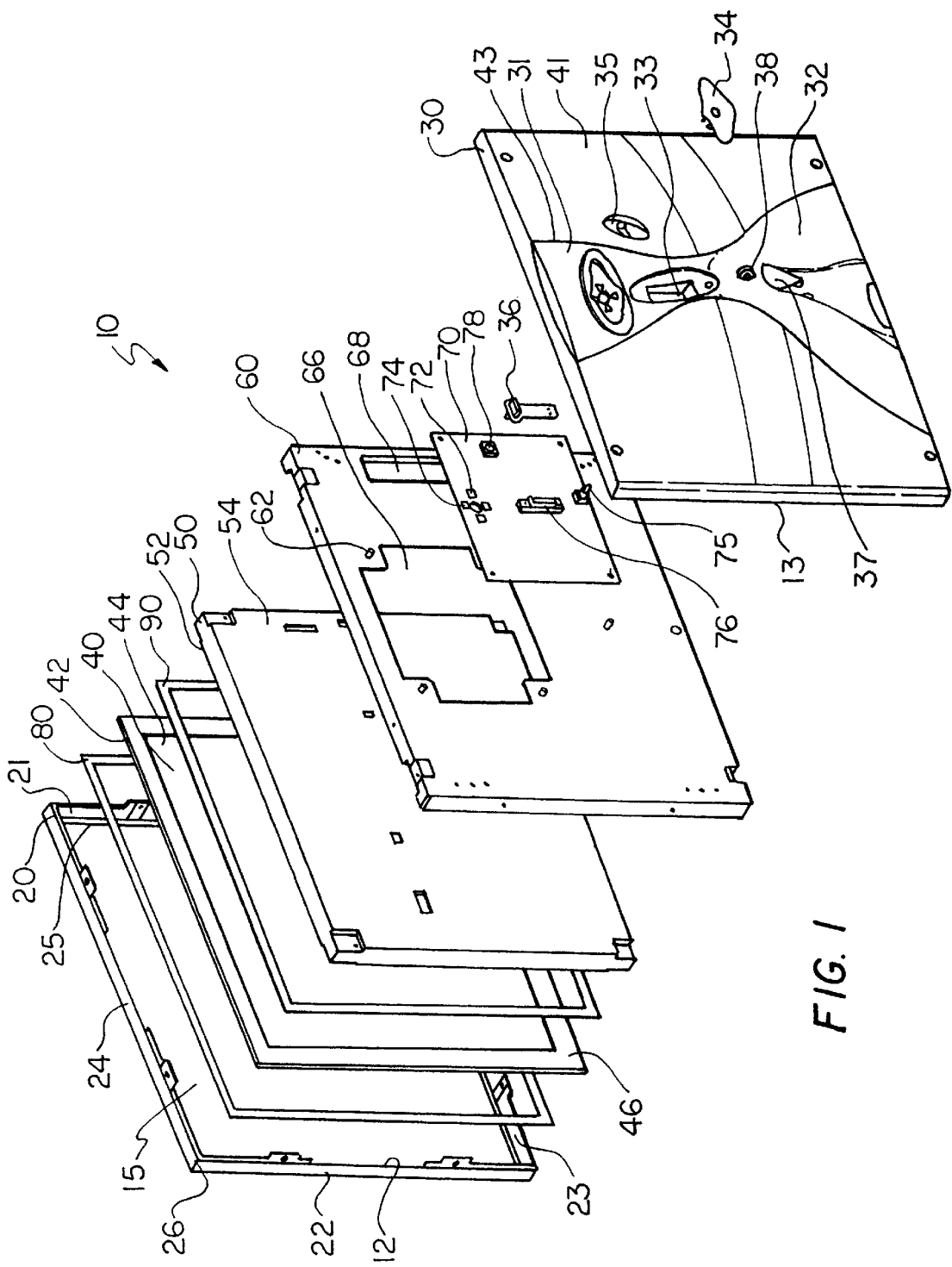
FIG. 1 is an exploded view of the flat panel display housing in accordance with the present invention.
Figure 2:
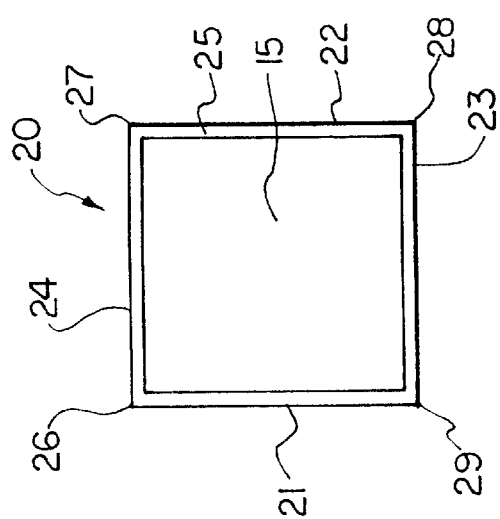
FIG. 2 is a frontal view of the housing.

FIG. 1 shows a flat panel display housing 10 according to the present invention. The housing 10 is comprised of injection molded ABS plastic, polycarbonate, a blend of ABS plastic and polycarbonate, or any other suitable material. The housing 10 includes a front portion 20, also shown in FIG. 2 which includes straight parallel opposing side edges 21, 22 and straight parallel opposing bottom and top edges 23, 24. The edges meet to form square corners 26, 27, 28 and 29. The front surface of front portion 20 includes a narrow bezel around the border or periphery 25 which defines an opening 15 in the front portion 20 of the housing for viewing a flat panel display screen therethrough. The border 25 in the present embodiment has a width of approximately 2.1 percent of the display width (a 12 inch by 15 inch display) and thus extends only a quarter of an inch or less from the side, top and bottom edges and compensates for the inability to get the tight tolerances needed with respect to the straight parallel edges for the glass of the display. The border 25 in this embodiment takes up only 13.5 square inches of space or approximately 7.5 percent of the screen surface of a 12 inch by 15 inch flat panel display. The border has a thickness of 0.060 inch from the front surface to the rear surface intended to confront the glass panel.

Referring again to FIG. 1, the housing 10 also includes a rear portion 30. While in this embodiment a two piece housing comprising front and rear portions 20, 30 is disclosed, it should be appreciated that alternative housing configurations may be employed, such as a housing having top and bottom portions or left and right side portions or various combinations and numbers of portions making up the housing. The front portion 20 and rear portion 30 further include interlocking edges 12, 13 to facilitate mating and assembly of the respective portions. The front to back dimension of the edges including front and rear portion 20 and 30, comprise narrow generally rectangular edges having a depth less than 1.25 inches in the preferred embodiment to provide a desired range of motion when used with the presently disclosed tilt/swivel mechanism and to provide a visual appearance which minimizes the perceived mass of the housing.

Rear portion 30 includes a central upper recessed generally concave section 31. Section 31 includes a panel display control 34 for adjustment of the panel display brightness and/or contrast. Section 31 is configured such that a user, located in front of the panel display housing, can reach over the top of the housing and easily locate the brightness/contrast control 34 and adjust the panel display. More specifically, the concave recessed section 31 provides a guide for the hand of the user which facilitates the location of the brightness/contrast controls 34 disposed within the concave section 31.

The rear portion also includes a second recessed section 35, located a distance away from recessed section 31, which surrounds a power switch button 36. The power switch button 36 is disposed in a side area 41 of the rear portion 30 of the housing 10 which has a convex, planar, concave curvilinear taper or other suitable taper generally from a ridge 43 defining a boundary between the recessed section 31 and the side area 41 to the respective edges of the rear portion 30 of the housing. By virtue of the contours of the recessed portion 31 and the side area 41 and the recessing of the power switch button 36 within a recess in the side area 41, the brightness/contrast controls of the panel display can be readily adjusted by a user without inadvertently turning the display off and similarly, the on/off switch can be readily located tactilely by a user. A third recessed section 33 is configured to receive an external cable (not shown) which carries signals and power to the display housing. The third recessed section 33 is configured such that the connector portion of the cable (not shown) inserted therein will not extend beyond the rear surface of the housing 10. Rear section 30 further includes a recessed section 32 for receiving a tilt/swivel mount, which is discussed in detail below.

A glass panel 40 is installed within the front portion 20, such that a front surface 42 of the glass panel 40 is positioned against an inside surface of border 25. The glass panel 40 may be provided with an anti-reflective coating on both the front surface 42 and the rear surface 44 and may include an anti-glare treatment etched on the front surface 42. Alternatively, the anti-glare treatment may be provided on the rear surface of the glass panel 40 or on both the front and rear glass panel surfaces. Further, the anti-glare treatment may be in the form of an anti-glare coating or any other suitable anti-glare treatment. An adhesive bead 80 is used to secure the glass panel 40 within the front portion 20 of the housing. A single sized glass panel is used which may be provided with an opaque mask 46 about the outer periphery. The width of the mask is specified to cover the region of the glass between the outer edge and the portion of the display which will be viewed through the mask. Thus, one housing may be used with displays of varying size and the mask employed to accommodate for the displayable area size variations. For example, flat panel displays from one manufacturer have a 15.0 inch panel display diagonal and another flat panel display from a second manufacturer has a 15.1 inch panel display diagonal. The mask is typically provided on the rear surface of the glass panel and comprises an opaque ink silk screened thereon, or a suitable treatment or mask comprising the masked area.

A flat panel display screen 50 is installed within the housing 10 such that a front surface 52 of the display 50 is adjacent the rear surface 44 of the glass panel 40. The panel display may be a Thin Film Transistor (TFT) type or a Dual Scan Twisted Nematic (DSTN) type display. A gasket 90 is inserted between the front surface 52 of the panel display 50 and the rear surface 44 of glass panel 40 to prevent the ingress of dust and/or moisture between the glass panel 40 and the panel display 50.

A chassis 60 is provided which mounts to the front portion 20 of the housing 10. Chassis 60 secures the panel display 50, the gasket 90, the glass panel 40 and the adhesive bead 80 to the front portion 20 of housing 10. Chassis 60 also contains a mount 62 for the printed circuit board (PCB) 70, and cutouts 66, 68 for cabling (not shown).

PCB 70 includes a power switch 78, a brightness control 72, a contrast control 74, a phase fine tune (PFT) encoder 75, a connector 76 for receiving power, ground control and data signals from an external video source or interface and a panel display interface. The connector 76 in this embodiment is selected to mate with a mini D ribbon connector such as the 3M Model 10326. The PCB 70 is in electrical communication with the panel display 50. The brightness control 72, contrast control 74, power switch 78, PFT 75 and connector 76 are accessible through recesses in rear portion 30, as discussed above. In this embodiment the contrast and brightness controls 72, 74 are integrated into a single four-way joystick style control having a button 34, though other embodiments could include individual adjustment controls as are known in the art.

Figure 3:
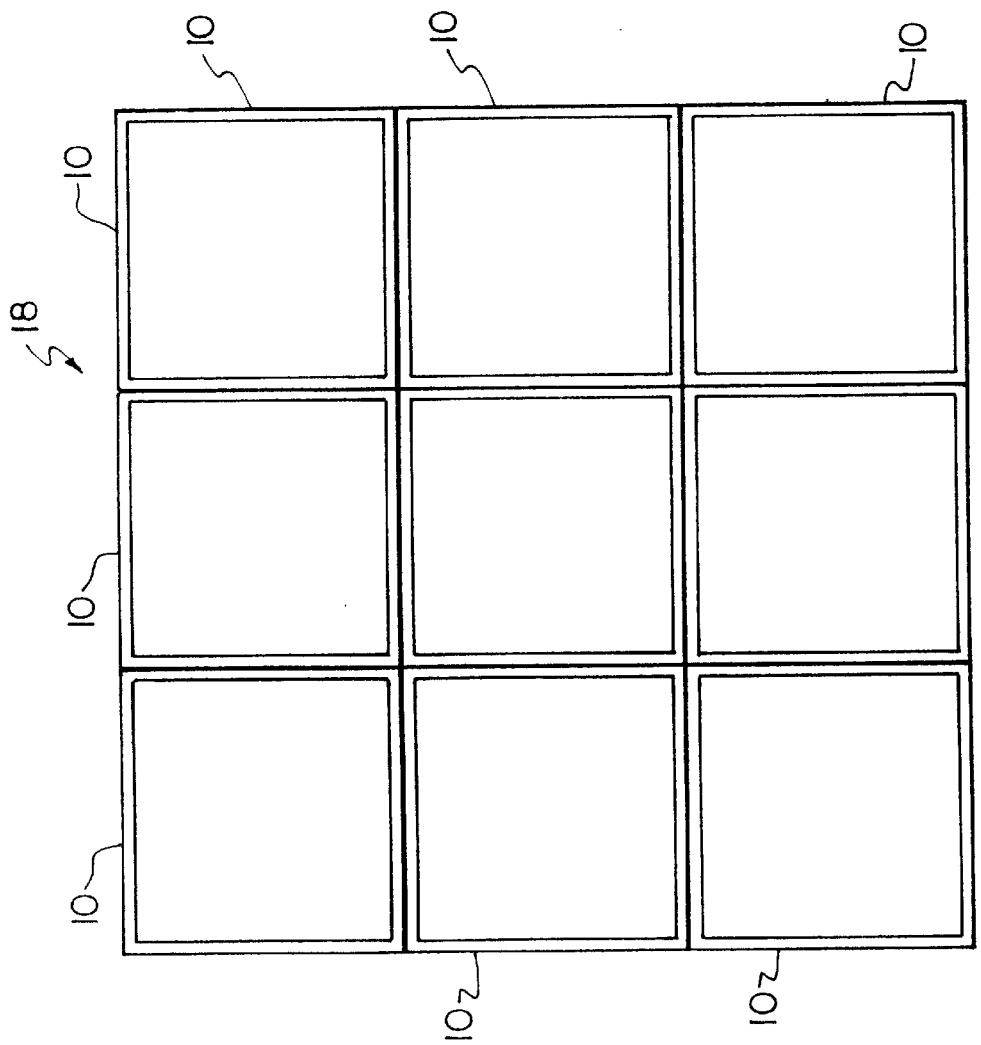
FIG. 3 is a diagram of a plurality of tiled displays forming a wall of glass.

Referring now to FIG. 3, a plurality of housings 10 are shown arranged in an array 18. The arrangement of flat panel display housings 10 in this manner is known as tiling. As can be seen in FIG. 3, nine housings 10 are arranged in a 3×3 array 100. Since the housing 10 has its mount generally centrally located on the rear surface of the housing, rather than beneath the housing, the housings can be placed one above another to form an array having a minimal non-display area between adjacent displays. The tiling of display housings 10 in this manner creates the wall of glass. While a 3×3 array 18 is shown here, it should be appreciated that a single row or a single column comprised of display housings 10 could also be formed, as could arrays having different numbers of display housings. Due to the straight parallel side edges and the straight parallel top and bottom edges the housings can be tiled without gaps between adjacent display housings. Similarly, as a consequence of the fact that the corners are square, plural housings mate without significant interstices at the corners. The corners in the preferred embodiment have a tight radius which is 0.060 inch.

Figure 4:
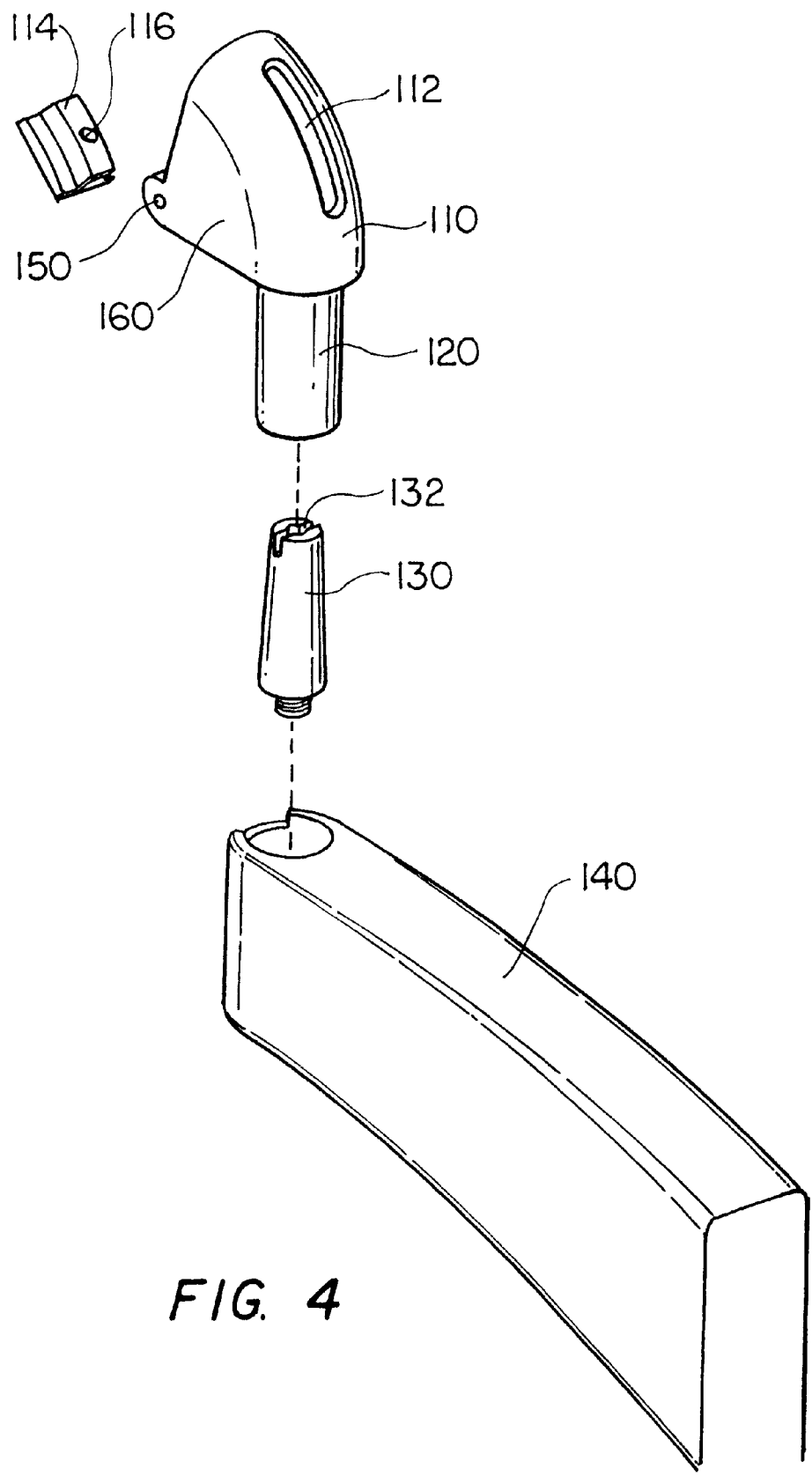
FIG. 4 is a diagram of a portion of a tilt/swivel mount for a flat panel display housing in accordance with the present invention.

Referring now to FIG. 4, a tilt/swivel mount 100 is shown which may be employed with the flat panel display housing 10. Tilt/swivel mount 100 comprises a knuckle 110 which includes a rounded surface having a slot 112 and a tubular neck portion 120. Knuckle 110 also includes a pair of generally parallel flat sides 160, each including a pivot point 150. A curved captive nut 114 is configured to fit inside the knuckle and includes a threaded bore 116 which aligns with slot 112 when installed. In this embodiment the pivot point 150 is defined by an aperture in each side 160 of the knuckle 110 into which a pivot pin (not shown) is inserted to mate with a portion of the housing 10, however the pivot point 150 may provided by any other means known in the art such as indents, protrusions or the like.

Neck portion 120 extends from the knuckle 110 and is configured to fit over and be rotatable about a vertical support 130. The support 130 has a truncated conical shape and is received within a support arm 140. Support 130 further includes a threaded bore centrally disposed within the top surface for receiving a bolt (not shown). The bolt functions as a swivel lock such that when installed and tightened the bolt will lock the knuckle to the support 130 thereby preventing the housing from swiveling. Support arm 140 may be extensible via the use of any suitable slide or extension mechanism so as to permit the flat panel display to be disposed closer to the user if desired.

Figure 5:
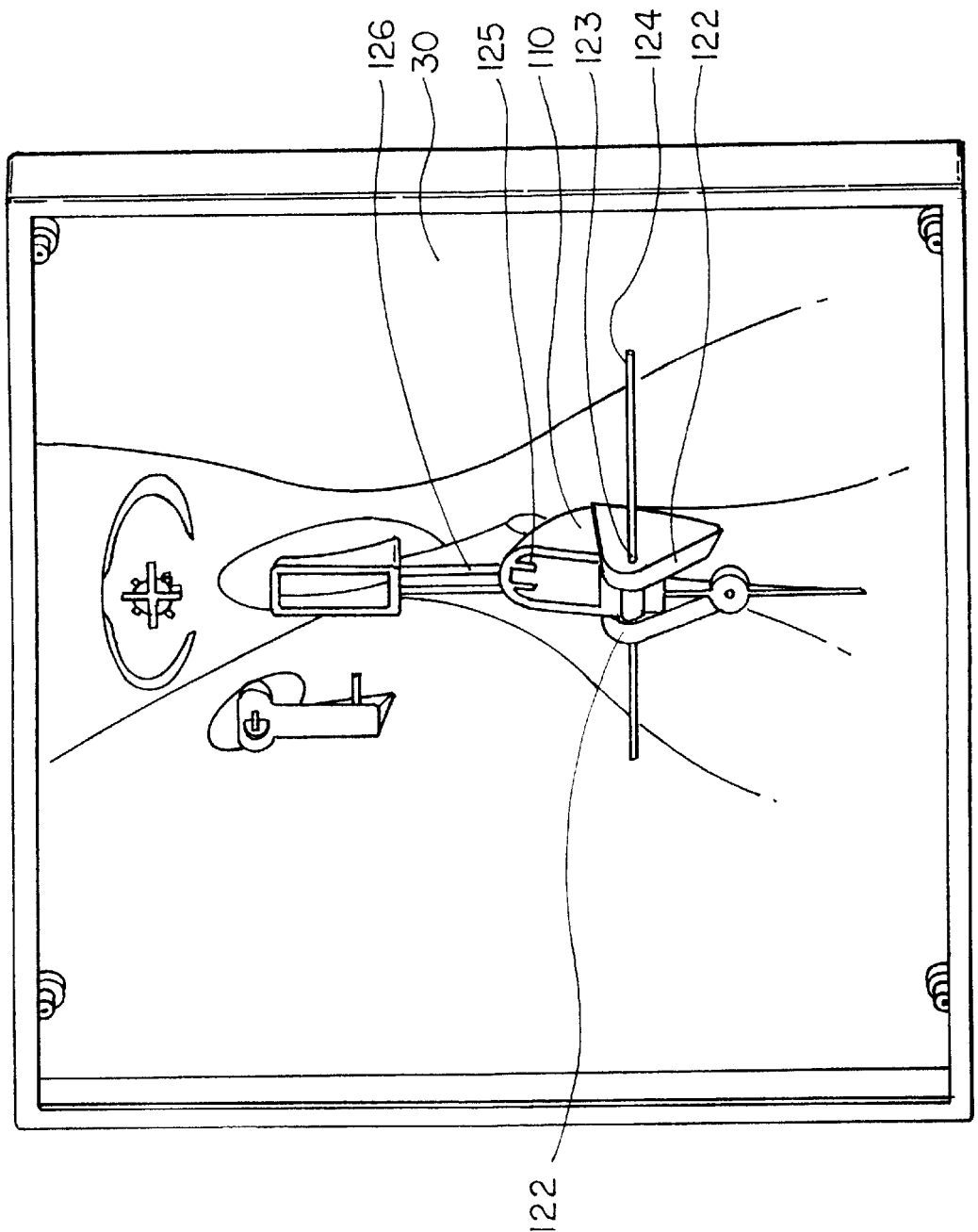
FIG. 5 is an isometric view of the coupling of the tilt/swivel mount to the housing.
Figure 6:
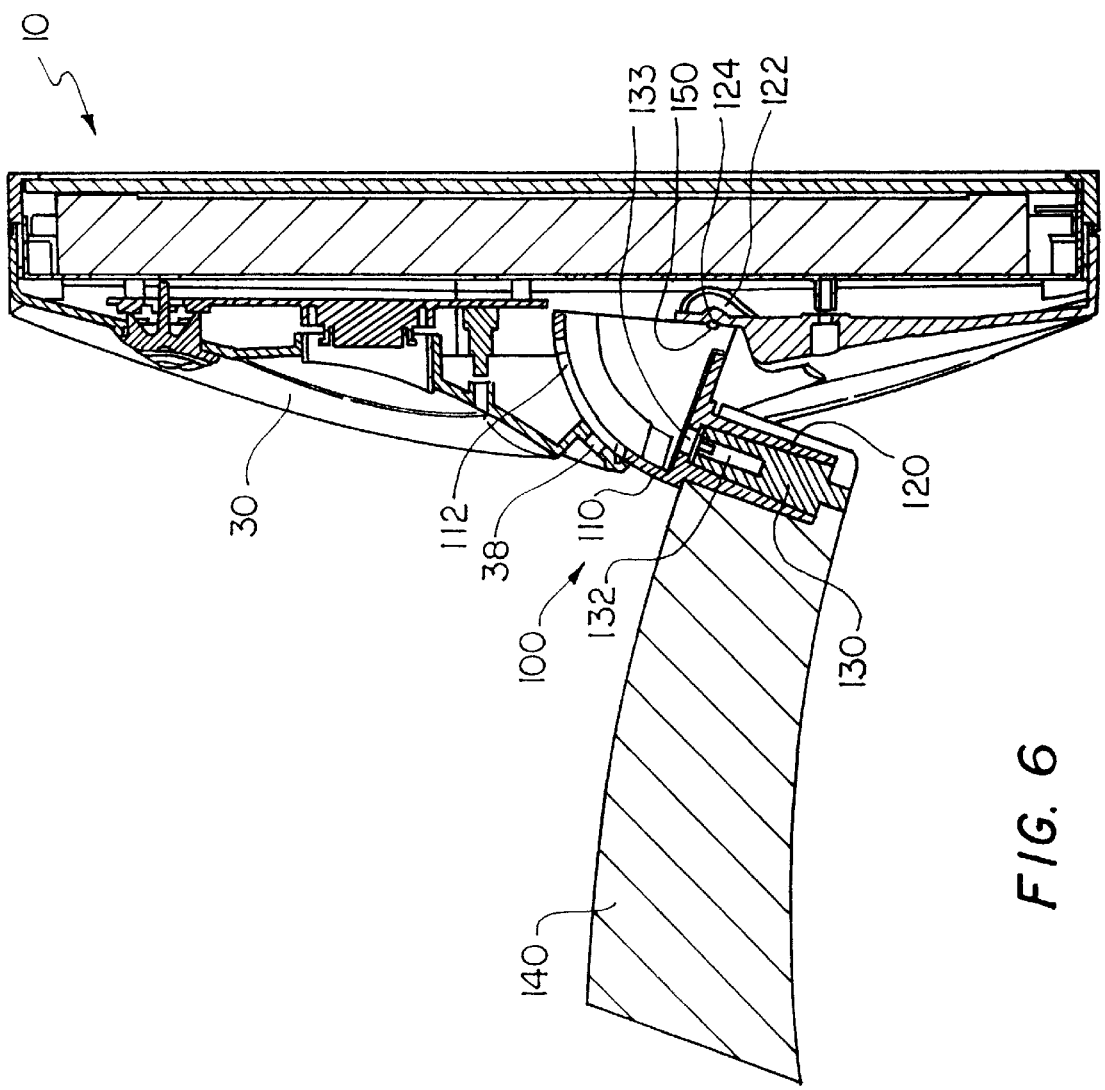
FIG. 6 is a cross-sectional view of the housing coupled to the tilt/swivel mount in accordance with the present invention.

Referring now to FIGS. 1, 5 and 6, the tilt/swivel mount 100 is integrated with the housing as follows. Rear portion 30 includes a bore 38. A portion of the knuckle 110 is inserted into opening 37. The slot 112 of knuckle 110 is aligned internally with rear portion bore 36. Rear portion 30 also includes a pair of pivot arms 122 fixed to an internal surface thereof, each pivot arm including a pivot hole 123 which aligns with the respective pivot points 150 of knuckle 110. A pivot pin 124 is inserted into the pivot points 150 and pivot holes 123, thereby coupling the mount 110 to the housing while permitting the mount 110 to pivotally tilt with respect to the housing 10 about a generally horizontal axis defined by the pivot point 150. A pair of curvilinear or arcuate ridges 126 located along the internal surface of rear portion 30 are configured to cooperate with and engage the curved surface of knuckle 112 such that the knuckle is slidably moveable along the curvilinear ridges 126.

The curved captive nut 114 is installed inside the knuckle and a top portion of the nut is configured to fit within a pair of curvilinear ridges 125 inside the curved surface of the knuckle 110. The curved captive nut 114 is retained within the knuckle 110 by a fastener (not shown) inserted through bore 38. Adjustment of the fastener provides a concomitant adjustment of the amount of friction between the rear portion ridges 126 and the knuckle 110, and the ridges 125 disposed inside the knuckle and the curved captive nut 114. The fastener can be adjusted to retain the mount in a predetermined position while still movable to other positions. The fastener can be further adjusted to lock the display housing such that the housing 10 cannot be tilted without additional adjustment of the fastener. While a preferred embodiment has been described for pivotally attaching the housing to the mount to provide a tilt mechanism, it should be appreciated that other attachment means may also be used.

The housing 10 is also pivotable about a generally vertical axis. More specifically, the neck portion 120 of the mount 100 has a hollow interior which generally conforms to the shape of the support 130. When the neck 120 is disposed over the support 130, the neck 120 is pivotable around the vertical axis of the support 130. In the preferred embodiment, the housing is pivotable within an envelope of movement of approximately 30° left from center, approximately 30° right from center along a vertical axis defined by the neck and support, and is pivotable approximately 20° rearward from center and 15° forward from center about a generally horizontal axis defined by the pivot points 150. In the preferred embodiment the pivot point 150 is configured to be at or below the center of gravity of the display, such that movement of the display to various positions within the envelope of movement does not cause a large weight shift, thus there is no increase in stress on the mount during repositioning of the display.

Arm 140 supports the tilt/swivel mount 100. The arm 140 may be extensible as discussed above so as to allow the display to be positioned closer to or farther from a user. Additionally, in an embodiment in which the tilt/swivel mount 100 and the extensible arm 140 are employed with display housings configured as a wall of glass, an individual display housing may be pulled forward (movement of the extensible arm along a horizontal axis) and the display housing 10 removed from the arm for replacement or service. A replacement display housing 10 may then be installed on the arm 140 and the display housing 10 retracted into the wall of glass.

Having described preferred embodiments of the invention it will be apparent to those of ordinary skill in the art that other embodiments incorporating these concepts may be used. Accordingly, the invention should not be viewed as limited to the described embodiments but rather should be limited only by the scope and spirit of the appended claims.

We claim:

1. A tilt/swivel mount comprising:
   a knuckle having a curved support surface and first and second spaced apart side surfaces, said curved support surface extending between said first and second spaced apart side surfaces, said curved support surface located at a predetermined distance from a pivot axis extending substantially orthogonally through said side surfaces, said distance being measured along a plane intermediate of and substantially parallel to said first and second side surfaces, said pivot axis being generally orthogonal to said plane, said knuckle having a neck end adjacent one end of said curved surface;
   a pivot mount integrally formed in said knuckle side surfaces and coaxially aligned with said pivot axis;
   a neck extending from said neck end of said knuckle, said neck having a predetermined length, said neck being pivotal about a swivel axis oriented in the direction of said length when mated with a cooperative neck support, said pivot axis and said swivel axis being substantially orthogonal to each other; and
   said knuckle adapted for supporting an object on said curved support surface and permitting pivotal rotation of said object around said pivot axis when said object is pivotally coupled to said knuckle via said pivot mount, and said knuckle further permitting swivel of said object around said swivel axis.

2. The tilt/swivel mount of claim 1 wherein said pivot mount comprises first and second opposing holes in said first and second side surfaces, said first hole and second hole coaxially aligned with said pivot axis.

3. The tilt/swivel mount of claim 2 wherein said pivot mount further comprises a pivot pin extending through said holes in said first and second sides.

4. A tilt/swivel mount and video display housing assembly comprising:
   a knuckle having a curved support surface and first and second spaced apart side surfaces, said curved support surface extending between said first and second spaced apart side surfaces, said curved support surface located at a predetermined distance from a pivot axis extending orthogonally through said side surfaces, said distance being measured along a plane intermediate of and substantially parallel to said first and second side surfaces, said pivot axis being generally orthogonal to said plane, said knuckle having a neck end adjacent one end of said curved surface;
   a pivot mount integrally formed in said knuckle side surfaces and coaxially aligned with said pivot axis;
   a neck extending from said neck end of said knuckle, said neck having a predetermined length, said neck being pivotal about a swivel axis oriented in the direction of said length when mated with a cooperative neck support, said pivot axis and said swivel axis being substantially orthogonal to each other; and
   said knuckle adapted for supporting a video display housing on said curved support surface and permitting pivotal rotation of said video display housing around said pivot axis when said object is pivotally coupled to said knuckle via said pivot mount, and said knuckle further permitting swivel of said video display housing around said swivel axis.

5. The assembly of claim 4 wherein said video display housing comprises a flat panel display housing.

6. The assembly of claim 4 wherein said mount includes a friction adjustment mechanism comprising:

a slot in the curved support surface of said knuckle;

a bore in a rear surface of the display housing, said bore aligned with said slot;

first ridges disposed within the rear surface of the display housing for movably engaging the curved surface of said knuckle;

second ridges disposed within an interior surface of the curved support surface of said knuckle;

a nut disposed within the interior of said knuckle, said nut having a threaded bore extending therein, wherein said nut is adapted to fit a portion thereof against said second ridges and wherein said threaded bore is aligned with the slot of said knuckle; and a fastener for coupling with said nut such that said fastener adjusts the level of friction between said knuckle curved surface and said first ridges.

7. The assembly of claim 6 wherein said fastener locks said housing to said knuckle.

8. The assembly of claim 4 wherein said pivot axis is located at or below a center of gravity of said video display housing.

9. The assembly of claim 4 wherein said neck is coupled to a first end of an arm.

10. The assembly of claim 9 wherein said arm comprises an extensible arm.

11. The assembly of claim 9 including a swivel lock comprising:

a vertical support including a threaded bore extending therein from a top surface thereof, said vertical support coupled to the arm;

said neck of said knuckle pivotally coupled to said vertical support;

a fastener for securing said knuckle to said vertical support, said fastener received within the threaded bore of said vertical support and biasing said knuckle against said vertical support.

12. The assembly of claim 4 wherein said pivot mount comprises first and second opposing holes in said first and second side surfaces, said first hole and second hole coaxially aligned with said pivot axis.

13. The assembly of claim 12 wherein said pivot mount further comprises a pivot pin extending through said holes in said first and second sides.

14. A tilt mechanism and a video display housing assembly comprising:

a video display housing having a rear surface;

said rear surface having at least one arcuate support surface integrally formed with said rear surface;

a display support member, said member having an upper arcuate portion;

said at least one arcuate support surface of said rear surface being slidably coupled in confronting relation with said upper arcuate portion of said display support member to permit pivotal movement of said display housing with respect to said display support member.

15. The assembly of claim 14 wherein said rear surface has an interior area including at least one arcuate support surface integrally formed on said interior area of said rear surface.

16. The assembly of claim 15 wherein said at least one arcuate support surface comprises at least one ridge having a curvilinear surface which extends from said interior area.

17. The assembly of claim 16 wherein said at least one arcuate support surface comprises two generally parallel ridges having curvilinear surfaces which extend from said interior area.

18. The assembly of claim 14 wherein said display support member is coupled to said rear surface of said housing via a fastener.

19. The assembly of claim 18 wherein the fastener comprises a bolt and a nut.

20. The assembly of claim 19 wherein friction associated with slidable movement between the surfaces of the rear surface of the housing with respect to the display support member is determined by the degree of tension applied via said bolt and said nut.

21. The assembly of claim 14 further comprising a swivel support member and wherein the display support member has a central axis and said display support member is coupled to said swivel support member such that said display support member is pivotable about said central axis.

22. The assembly of claim 21 wherein said display support member has a lower end and an opening in the form of a generally truncated cone extending into said display support member from said lower end.

23. The assembly of claim 21 wherein said swivel support member comprises a post having an upper portion and wherein said upper portion is in the form of a generally truncated cone sized to fit within said opening within said lower end of said display support member such that said display support member is pivotable about said swivel support member when said swivel support member truncated cone portion is disposed within said opening within said lower end of said display support member.

24. The assembly of claim 23 further comprising a retaining bolt and wherein said display support member includes an opening along said central axis to receive said retaining bolt, said swivel support member has a central axis and a threaded bore extending into the upper end of said swivel support member and said bolt extends through said opening along said central axis and is threaded into said threaded bore within said swivel support member to couple said display support member to said swivel support member.

* * * * *